April 23, 1940.
D. W. SESSIONS
2,198,018
FLUID PRESSURE SYSTEM
Filed May 12, 1937
3 Sheets-Sheet 1
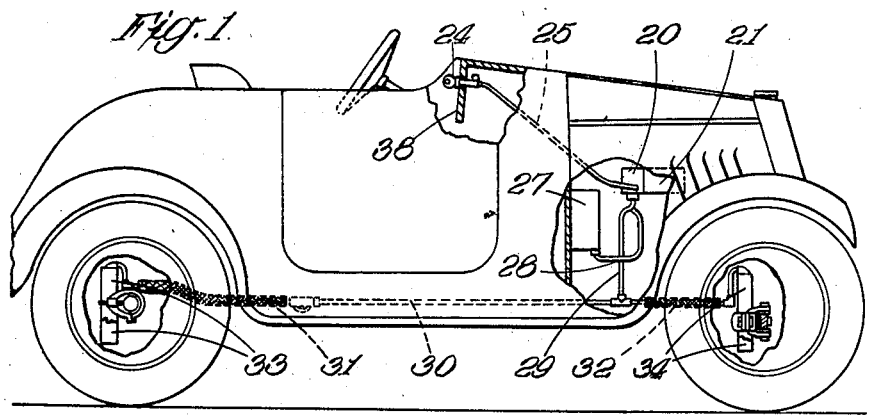
Fig. 1.
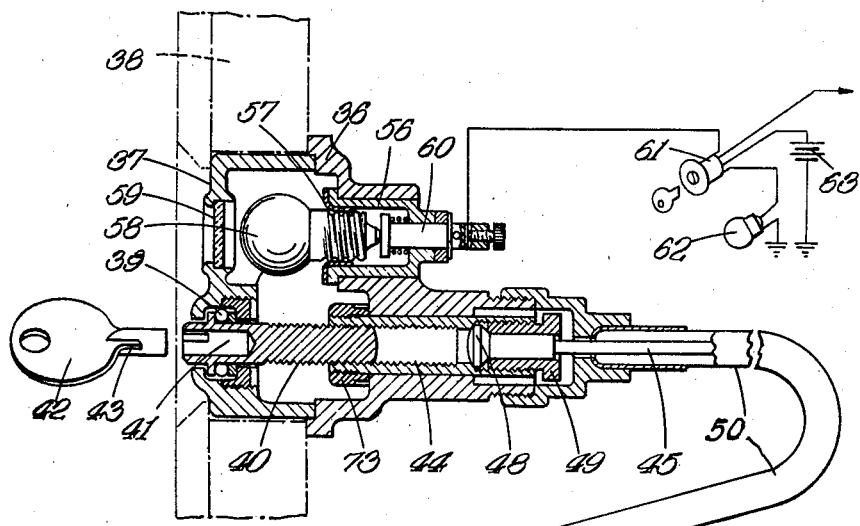
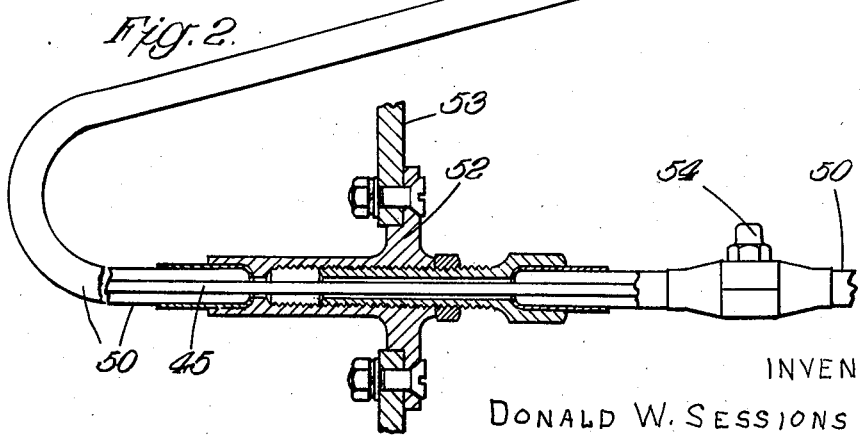
Fig. 2.
INVENTOR
DONALD W. SESSIONS
By Young, Emery & Thompson
ATTORNEYS April 23, 1940.  D. W. SESSIONS  2,198,018
FLUID PRESSURE SYSTEM
Filed May 12, 1937  3 Sheets—Sheet 2
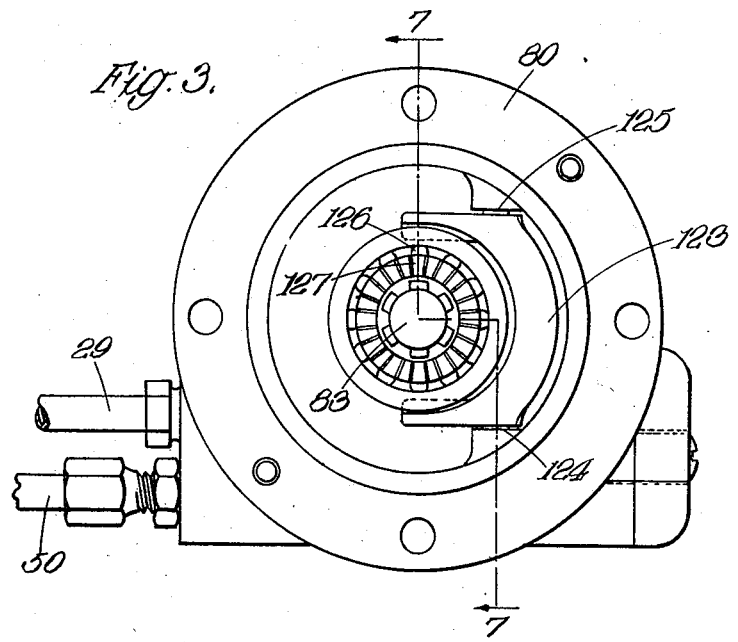
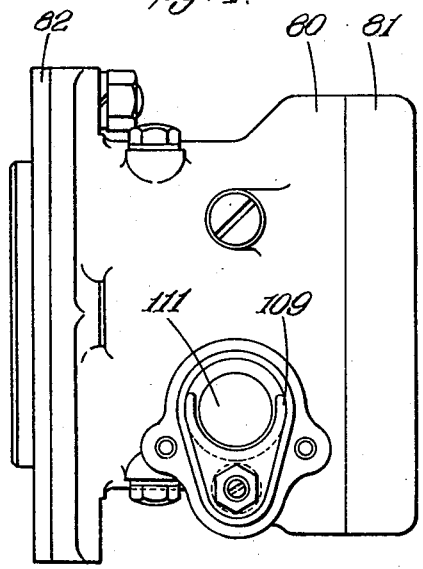
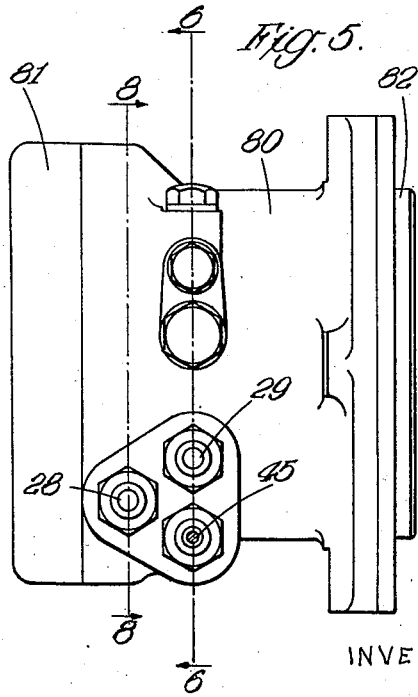
INVENTOR
DONALD W. SESSIONS
By Young, Emery & Thompson
ATTORNEYS INVENTOR
DONALD W. SESSIONS
By Young, Emery & Thompson
ATTORNEYS Patented Apr. 23, 1940

2,198,018

UNITED STATES PATENT OFFICE 2,198,018

FLUID PRESSURE SYSTEM

Donald Wilfred Sessions, London, England

Application May 12, 1937, Serial No. 142,289
In Great Britain May 26, 1936

11 Claims. (Cl. 103—23)

The present invention relates to fluid pressure systems especially suitable for jacking systems for vehicles.

The present invention comprises a fluid pressure system operable by fluid pressure supplied by a pump driven by clutching to a driving member and having a device which is moved by the pressure supplied when this pressure exceeds a predetermined maximum, and which effects disengagement of the clutch.

In a constructional arrangement the clutch members are relatively moved by resilient means under the control of the operator for moving the clutch members into engagement and a device acted on by the pressure supplied to the jack or jacks serves to move the clutch members apart and maintain them apart against the action of said resilient means when and so long as the pump output pressure exceeds a predetermined maximum.

Other features of the fluid system will be described hereinafter and will be defined in the appended claiming clauses.

The system is especially suitable for incorporation in a jacking system for permanent attachment to a motor vehicle and supplies fluid pressure to the jacks whereby the clutch is automatically disengaged when the jacks reach the limit of their extensibility.

In order that the invention may be clearly understood and readily carried into effect the same will now be more fully described with reference to an exemplary form of the invention illustrated in the accompanying drawings wherein:

Figure 1 is a diagrammatic illustration of a motor-car having applied thereto a fluid system made in accordance with the invention and embodied in a vehicle jacking system;

Figure 2 is a sectional view of the driver's control device and indicator device;

Figure 3 is an end elevational view of the pump casing and adjacent controlling means;

Figure 4 is an elevational view looking on the right hand end of Figure 3;

Figure 5 is an elevational view looking on the left hand end of Figure 3;

Figure 6:
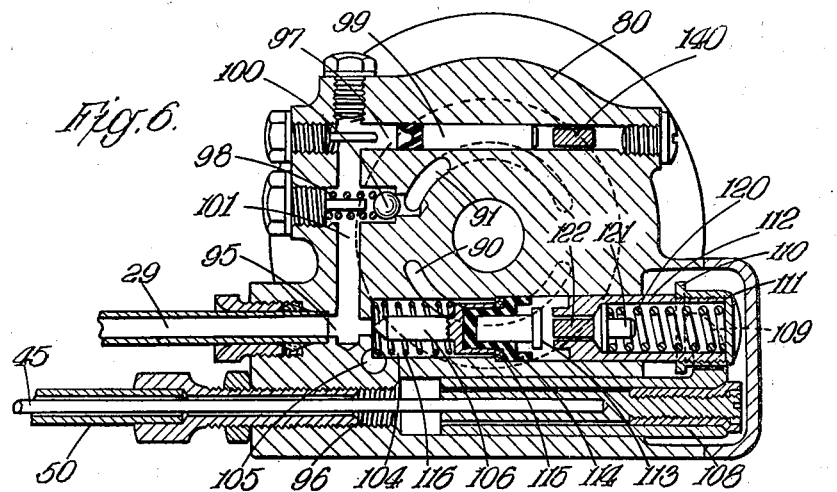
Figure 6 is a sectional view on the line 6—6 on Figure 5.

The pump 20 is mounted on the vehicle in a suitable position according to the part from which it is to be driven. In Figure 1 the pump 20 is shown attached to a dynamo 21 to which it can be coupled. The driving and stopping of the pump is effected through a control on the dashboard indicated generally at 24 which is connected by a cable 25 or similar device other than a high pressure fluid pipe line to the pump, or by a control mounted on the pump adjacent thereto. The pump draws oil from a reservoir 27 through a pipe 28 and forces the oil through a discharge pipe 29 into a horizontal pipe line 30 and flexible tubes 31, 32, to a pair of hydraulically operated jacks 33 permanently attached to the rear axle and to a pair of hydraulically operated jacks 34 permanently attached to the front axle. The lifting jacks and means for attaching them permanently to the vehicle may be as disclosed in the specification of our co-pending patent application No. 53,157.

When the pump is operating, an electrical indicator gives warning to the driver so long as the ignition circuit of the vehicle is closed. This electrical indicator is actuated by the same control device that is operated for starting and stopping the pump and for releasing fluid from the jacks.

As shown in Figures 1 and 2, a casing comprising a body 36 and a cap 37 are fitted into the dashboard 38. Rotatably mounted in the casing by a ball bearing 39 is a threaded socket spindle 40 having a slotted socket 41 into which the driver fits a detachable key 42 for rotating the socket spindle. The key has side fins 43 to engage in the slots in the socket. The inner end of the socket spindle 40 is threaded into an internally tapped sleeve 44 which is of square section and slides in an aperture of similar section in the casing so that the sleeve is moved axially when the spindle 40 is rotated. Fixed to this sleeve is one end of a cable 45 the other end of which controls the pump as hereinafter to be described. The connection is effected by a head 48 on the cable held by a threaded bush or block 49. The cable 45 is enclosed by a tube 50 which is in two parts connected by an adjuster 52 carried by the metal dash 53 of the vehicle, and provided with a greaser 54.

The casing also carries an insulator block 56 and this block carries a metal holder 57 for an electric lamp 58 comprising the indicator or warning means visible to the driver through a window 59. The block 56 also carries a conductor 60 which connects with the central terminal of the lamp and with the usual ignition switch 61. The lamp is arranged in an electric circuit which includes the vehicle batteries 63, the ignition switch 61, and the usual ignition lamp 62. When the ignition switch is open no current can pass through the lamp 58 and when the ignition switch is closed current can only pass through the lamp 58 if the metal holder 57 (normally insulated by the block 56) is earthed.

The lamp circuit includes spaced conductor arms adapted to be bridged by a brass collar 73 on the sleeve 44 when the latter has been moved for setting the pump in operation but normally these arms are not so bridged. When the arms are bridged the holder 57 is earthed.

The construction of this electric light warning system is more fully disclosed in the complete specification of my Patent No. 2,109,238.

The electric circuit will be broken either by turning the engine switch off or by rotating the key 42 sufficiently in the opposite direction to uncouple the pump from the said driving member. If for instance the jacks are left extended and the vehicle is left overnight, the engine switch will be "off" and the lamp will therefore not be using the vehicle batteries, but when the engine switch is turned on the lamp circuit will be completed and will warn the driver that the jacks are extended.

Figures 7, 9:
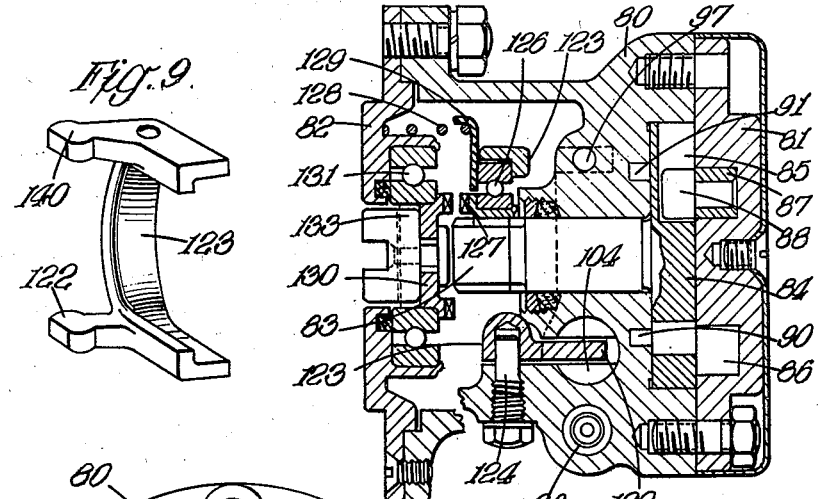
Figure 7 is a sectional view on the line 7—7 on Figure 3.
Figure 9 is a perspective detail view of a clutch yoke to be described.
Figure 8:
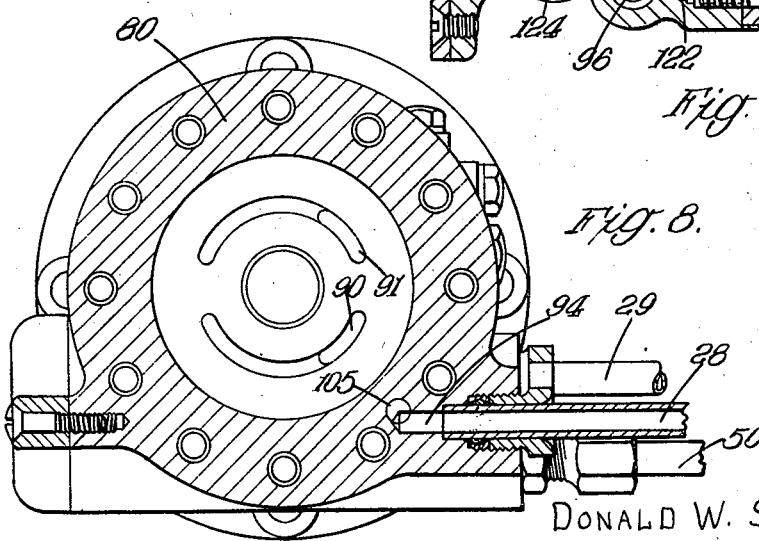
Figure 8 is a sectional view on the line 8—8 on Figure 5.

The pump is of the annular piston type and similar in principle to the arrangements described in the specification No. 1,997,233. The pump body or casting 80 has a pump cap 81 attached to it at one end, and a clutch carrying cap 82 attached to it at the other end. The pump body carries a rotary pump spindle 83 on which is a rotor 84 having three radial slots 85 of which only one is shown in Figure 7. The cap 81 has an annular recess 86 therein located eccentrically with respect to the axis of the spindle 83. The annular piston blocks 87 are disposed in the recess 86 and each carries a roller 88 located in one of the radial slots 85. When the spindle is rotated the piston blocks rotate and move apart and together alternately and draw oil into the spaces between them from the inlet port 90 (Figure 6) and expel this oil to the outlet port 91 in the pump body.

In the pump are three adjacent and parallel bores 94, 95, 96, receiving respectively the pipe 28 from the tank 27, the pipe 29 to the jacks, and the cable 45 and tube 50 from the dashboard control. This adjacent arrangement facilitates construction and assembly. The pump body has also two other parallel bores 97, 98 the former of which contains a piston 99 for a purpose to be described and the latter of which connects with the pump outlet port 91 and contains a non-return valve 100. A transverse bore 101 in the pump body connects the bores 97, 98, 95, which thus all become filled with fluid at the pressure of the fluid in the pipe 29 and in the jacks. The inlet port 90 of the pump connects with an enlarged continuation 104 of the bore 95 and the enlarged bore 104 connects through a conduit 105 with the inlet bore 94 and pipe 28 whereby the pump draws liquid from the tank. Between the bore 95 and its continuation 104 is a release valve 106 which permits or prevents communication between 104 and 95. When this valve is open the liquid from the jacks and delivery side of the pump can escape back to the pipe 28 and tank 27 and when the valve is closed the liquid delivered by the pump will be utilised to extend the jacks. The release valve is actuated by the movements of the cable 45. For this purpose the cable 45 is connected to a tubular slide block 108 disposed in an enlarged part of the bore 96. This block has a bifurcated foot 109 which engages a flange 110 on a cap 111 screwed on to a sliding tube 112 disposed in the further enlarged part of the bore 95, 104. This tube when moved to the left (Figure 6) engages a metal button 113 which is seated in a rubber block 114 which seats against a washer 115 and this washer in turn seats against a shoulder in the bore. The rubber block is located in the hollow end of the valve member 106. When the button 113 is pressed (to the left, Figure 6) it deforms the rubber block sufficiently to press the valve member 106 on to its seating. The rubber block also enables the valve member to align itself with its seating. The return of the valve member is effected by a spring 116.

Operation of the key and socket 40 in one direction causes movement of the cable 45 to the left (Figure 6) and thus closes the valve for enabling the jacks to be extended and simultaneously causes the electric circuit of the indicator or warning light on the dashboard to be closed. This movement of the cable also simultaneously effects starting of the pump as now to be described. Movement of the key and socket 40 in the opposite direction enables the cable 45 to move to the right to open the release valve, breaks said electric circuit, and stops the pump.

Within the tube 112 is a spring 120 that presses against a button 121 which in turn presses against a lug 122 on a clutch operating yoke 123. This yoke is pivoted on pins 124, 125 and carries a ball bearing 126 the inner race of which is mounted on a sliding clutch member 127 which is splined on to the pump spindle 83. A spring 128 acting on a disc 129 presses the ball bearing and clutch member 127 in the return direction. An opposed clutch member 130 is mounted in a ball bearing 131 carried by the clutch cap 82 and is continuously rotated through an Oldham coupling 133 by connection to the magneto or other driven part of the vehicle engine. The teeth of the clutch members are preferably of truncated conical shape so that they disengage if, for instance, the pump should jam. When the cable 45 is moved to close the release valve, the clutch members are engaged and the pump is driven. It will be seen that the clutch member, yoke, and other parts are housed in a hollow extension of the pump body which is closed by the cap 82.

When the jacks have been fully extended the pump will be stopped. For this purpose the fluid that passes valve 100 builds up a pressure in the bores 101 and 97 and this pressure presses the already mentioned piston 99 against another lug 140 on the yoke 123 and when the delivery pressure is great enough to overcome the force of the spring 120 the yoke will be moved to uncouple the clutch members without opening the valve 106. The lug 122 presses against the button 121 and compresses the spring 120 whilst the tube 112 continues to hold the valve closed until the cable 45 is operated for releasing the jacks.

Instead of coupling the pump to the dynamo it may be coupled to the fan, water pump, ignition distributor drive, engine oil pump, revolution counter drive, cam shaft, crank shaft, or other suitable parts, or to an electric motor and may be coupled directly or by means of a belt, chain, shaft, flexible shaft or other drive.

I claim:

1. A fluid pressure apparatus comprising a pump for supplying fluid under pressure, clutch members carried by the pump body and adapted for connecting a driving member to and disconnecting it from the pump for driving the pump, a control member carried by the pump body and movable by the operator, means housed in the pump body and including a resilient element for transmitting the movement of said control member to one of the clutch members for moving the clutch members into engagement and tending to resiliently hold said clutch members in engagement, and a movable clutch disengaging element housed in the pump body and acted on by the pressure on the delivery side of the pump and moved thereby, the arrangement being such that when the said pressure exceeds a predetermined degree the said movable element is caused to disengage the clutch members against the action of said resilient means while said control member is in its clutch engaging position.

2. A fluid pressure apparatus comprising a pump for supplying fluid under pressure, clutch members carried by the pump and adapted for connecting a driving member to and disconnecting it from the pump for driving the pump, a movable clutch disengaging element housed in the pump body and acted on by the pressure on the delivery side of the pump and moved thereby, a control member carried by the pump body and movable by the operator, and means including a resilient element for transmitting the movement of said control member to one of the clutch members for moving the clutch members into engagement and tending to resiliently hold said clutch members in engagement, the arrangement being such that when the said pressure exceeds the pressure of the resilient element the movable element is caused to disengage the clutch members while the said control member is in its clutch engaging position.

3. A fluid pressure apparatus comprising a pump for supplying fluid under pressure, clutch members carried by the pump body and adapted for connecting the driving member to and disconnecting it from the pump for driving the pump, a coacting piston and cylinder in the pump body in communication with the delivery side of the pump, at least one of these elements being movable, a control member carried by the pump body and movable by the operator, and means including a resilient element for transmitting the movement of said control member to one of the clutch members for moving the clutch members into engagement and tending to resiliently hold said clutch members in engagement, the arrangement being such that when the said pressure exceeds the pressure of the said resilient means the movable element is caused to disengage the clutch members while the said control member is still in its clutch engaging position.

4. A fluid pressure apparatus comprising a pump for supplying fluid under pressure, clutch members carried by the pump body adapted for connecting a driving member to and disconnecting it from the pump for driving the pump, a pivoted yoke mounted in the pump body for moving one of the clutch members into engagement with the other clutch member, a coacting piston and cylinder in the pump body in communication with the delivery side of the pump, one at least of these two elements being movable and adapted to impart movement to the clutch member which is movable by the yoke but in the opposite direction, clutch operating means in the pump body, and resilient means interposed between the operating means and yoke for actuating the yoke for engaging the clutch members and tending to resiliently hold the clutch members in engagement, the arrangement being such that when the said pressure exceeds the pressure of the said resilient means the yoke is caused to disengage the clutch members while the clutch operating means is in its clutch engaging position.

5. A fluid pressure apparatus comprising a pump for supplying fluid under pressure, clutch members carried by the pump body and adapted for connecting a driving member to and disconnecting it from the pump for driving the pump, a pivoted yoke carried by the pump body for moving one of the clutch members into engagement with the other clutch member, a slidable member disposed in the pump body which the operator can actuate, means including spring means for transmitting movement from the slidable member to the yoke, a coacting piston and cylinder in the pump body and in communication with the delivery side of the pump and one at least of these two elements being movable and adapted to impart movement to the clutch member which is movable by the yoke but in the opposite direction, and clutch operating means actuating the yoke for engaging the clutch members, the arrangement being such that when the said pressure exceeds the pressure of the said resilient means the yoke is caused to disengage the clutch members while the clutch operating means is still in the clutch engaging position.

6. A fluid pressure apparatus comprising a pump for supplying fluid under pressure, and having a pump body and a rotary spindle to be driven, a clutch member mounted co-axially on the rotary spindle, a coacting clutch member disposed co-axially with respect to the first clutch member, a yoke arranged adjacent to the rotary spindle for moving one of the clutch members into engagement with the other clutch member, a hollow extension of the pump body housing the clutch members and yoke, means for actuating the yoke, which means extend outside the pump body for actuation by the operator, a coacting piston and cylinder mounted in the pump body and arranged in communication with the delivery side of the pump and adapted to impart movement to the clutch member which is movable by the yoke but in the opposite direction, clutch operating means actuating the yoke for engaging the clutch members, and resilient means interposed between the operating means and yoke tending to hold the clutch members in engagement, the arrangement being such that when the said pressure exceeds the pressure of the said resilient means the yoke is caused to disengage the clutch members while the clutch operating means is still in its clutch engaging position.

7. A fluid pressure apparatus comprising a pump for supplying fluid under pressure and having a pump body, clutch members adapted for connecting a driving member to and disconnecting it from the pump for driving the pump, and a movable element acted on by the pressure on the delivery side of the pump and moved thereby, the clutch members and movable element being all mounted in the pump body, the arrangement being such that when the said pressure exceeds a predetermined degree the movable element is caused to disengage the clutch members.

8. A fluid pressure apparatus comprising a pump for supplying fluid under pressure and having a pump body and a rotary spindle to be driven, a hollow extension of the pump body, a clutch member mounted co-axially on the rotary spindle within said hollow extension, a cap covering the end of the hollow extension, a coacting clutch member mounted on the cap within the hollow extension, a pivoted yoke for moving one of the clutch members into engagement with the other clutch member, said yoke being located within said hollow extension, a coacting piston and cylinder in communication with the delivery side of the pump and adapted to impart movement to the clutch member which is movable by the yoke but in the opposite direction, clutch operating means actuating the yoke for engaging the clutch members, and resilient means interposed between the operating means and the yoke tending to hold the clutch members in engagement, the arrangement being such that when the said pressure exceeds the pressure of the said resilient means the yoke is caused to disengage the clutch members while the clutch operating means is still in its clutch engaging position.

9. A fluid pressure apparatus comprising a pump for supplying fluid under pressure and having a pump body provided with four parallel bores, one of which serves for intake of fluid and another for outlet of fluid, clutch members adapted for connecting a driving member to and disconnecting it from the pump for driving the pump, a clutch moving member for moving one of the clutch members into engagement with the other clutch member, a piston in the third of said bores and in communication with the delivery side of the pump and adapted to impart movement to the clutch member which is movable by the clutch moving member but in the opposite direction, a projection on the clutch moving member projecting into the said third bore, another projection on the clutch moving member extending into a continuation of the outlet bore, a valve in said continuation for controlling release of fluid from the delivery side of the pump, an element in the fourth of said bores which element is operable by the operator and imparts movement to the said valve and to the second mentioned projection for engaging the clutch members and closing the valve, and a spring between said element and said second mentioned projection, the arrangement being such that when the said pressure exceeds the pressure of the said resilient means the first mentioned projection is moved to disengage the clutch members against the action of said spring while the clutch moving member is still in its clutch engaging position.

10. A fluid pressure apparatus comprising a pump for supplying fluid under pressure, and having a pump body provided with two parallel bores, clutch members adapted for connecting a driving member to and disconnecting it from the pump for driving the pump, a pivoted yoke for moving one of the clutch members into engagement with the other clutch member, a projection on the yoke extending into one of said bores, another projection on the yoke extending into the other of said bores, a piston in one of said bores and in communication with the delivery side of the pump, and adapted to impart movement to the projection therein to move the clutch member in the direction to disengage the clutch, clutch operating means acting on the other of said projections to actuate the yoke for engaging the clutch members, and resilient means interposed between the operating means and the yoke tending to hold the clutch members in engagement, the arrangement being such that when the said pressure exceeds the pressure of the said resilient means, said piston moves the associated projection to disengage the clutch members while the clutch operating means is in the clutch engaging position.

11. A pump of the character described, comprising a pump body casting, a rotary driven pump-actuating element mounted in said casting, a rotary driving element housed within said casting, clutch elements associated with the driving and driven members, resilient means urging said clutch elements into power transmitting contact, said casting having a fluid discharge port, and a bore formed directly in the casting in communication with the discharge port, a piston in said bore subjected to the pump discharge pressure, and means connecting said piston and clutch elements for disengaging said clutch elements when the pressure is high enough to overcome the force of said resilient means.

DONALD WILFRED SESSIONS.